(12) United States Patent
Sotiriades

(10) Patent No.: US 7,441,529 B2
(45) Date of Patent: Oct. 28, 2008

(54) PITOT ENGINE CRANKSHAFT OIL PUMP

(75) Inventor: Aleko D. Sotiriades, Cedarburg, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 11/685,459

(22) Filed: Mar. 13, 2007

(65) Prior Publication Data

US 2008/0223331 A1  Sep. 18, 2008

(51) Int. Cl.
*F02B 61/04* (2006.01)
(52) U.S. Cl. .................. 123/196 W; 184/6.18
(58) Field of Classification Search ............. 123/196 R, 123/196 W; 415/88; 184/11.1, 6.18
See application file for complete search history.

(56) References Cited

U.S. PATENT DOCUMENTS

| | | | |
|---|---|---|---|
| 2,565,950 A * | 8/1951 | Crider | 137/514 |
| 3,037,583 A * | 6/1962 | Ford | 184/11.1 |
| 3,858,685 A | 1/1975 | Bono | |
| 4,432,693 A | 2/1984 | Hackbart | |
| 5,221,199 A | 6/1993 | Jang | |
| 6,860,365 B2 | 3/2005 | Stones | |
| 2003/0015373 A1 | 1/2003 | Stones | |

* cited by examiner

*Primary Examiner*—Noah Kamen
(74) *Attorney, Agent, or Firm*—Whyte Hirschboeck Dudek SC

(57) ABSTRACT

The oil pump comprises an open ended conduit extending from a connecting rod journal to below the surface of oil in a crankcase. The conduit is bent and oriented such that the open end is tangential to the radius of crankshaft rotation and faces in the direction of rotation. Channels in the crankshaft and connecting rod journal provide flow paths between the upper end of the conduit and at least one bearing surface.

39 Claims, 2 Drawing Sheets

PITOT ENGINE CRANKSHAFT OIL PUMP

FIELD OF THE INVENTION

The present invention relates to a low cost, simple and easy-to-manufacture crankshaft driven oil pump.

BACKGROUND OF THE INVENTION

The crankshaft and connecting rods of an internal combustion engine have various bearing surfaces that require lubrication. Such bearing surfaces are lubricated by moving oil around in a crankcase. The oil is typically moved by using an oil pump to transfer the oil through flow channels. However, for practical purposes, the design of the oil pump should be as simple as possible to minimize costs and maintenance.

In particular, for small utility engines that are used for such applications as lawn mowers and other yard appliances, elaborately designed oil pumps would undesirably increase the complexity of the engine design, the cost of manufacture, and the necessary maintenance. Therefore, provision of a simple, easy to manufacture oil pump having minimal moving parts is a desired goal of this small utility engine market. One objective of this invention is to provide such an oil pump.

BRIEF SUMMARY OF THE INVENTION

In one embodiment, the invention is an oil pump comprising an engine crankshaft having an axis of rotation. The crankshaft comprises a connecting rod journal that is offset from the axis of rotation and is located on a portion of the crankshaft that extends through a crankcase, wherein the crankcase is designed to contain a volume of oil. A conduit extends from the connecting rod journal to a point below the upper surface of the volume of oil. The conduit has an open lower end and is bent such that the open lower end is oriented tangentially to a radius extending from the crankshaft axis of rotation to an upper end of the conduit. A first channel provides fluid communication between a first bearing surface located on the connecting rod journal and the upper end of the conduit. In some embodiments, a second channel can provide fluid communication between the upper end of the conduit and further bearing surfaces.

In another embodiment, the invention is a method of providing lubricating oil to a bearing surface of a connecting rod journal on a crankshaft. The connecting rod journal is offset from the axis of rotation of the crankshaft. The method comprises immersing an open lower end of a conduit in a volume of oil contained within an engine crankcase. The upper end of the conduit connects to the connecting rod journal. A first channel provides fluid communication between the upper end of the conduit and a bearing surface on the connecting rod journal. The conduit is positioned such that the open lower end is oriented tangentially to a radius extending from the crankshaft axis of rotation to an upper end of the conduit, wherein the conduit is bent such that the lower open end has an opening facing towards a direction of rotation of the crankshaft. The crankshaft is rotated around the axis of rotation such that the lower end of the conduit moves through the volume of oil in a circular path centered on the axis of rotation. The movement of the conduit through the volume of oil forces oil to flow through the conduit and first channel to the bearing surface on the connecting rod journal.

BRIEF DESCRIPTION OF THE DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts or steps.

DETAILED DESCRIPTION OF THE PREFERRED EMBODIMENT

In the following detailed description, references made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical and geometric changes may be made without departing from the spirit and scope of the present invention.

Figure 1:
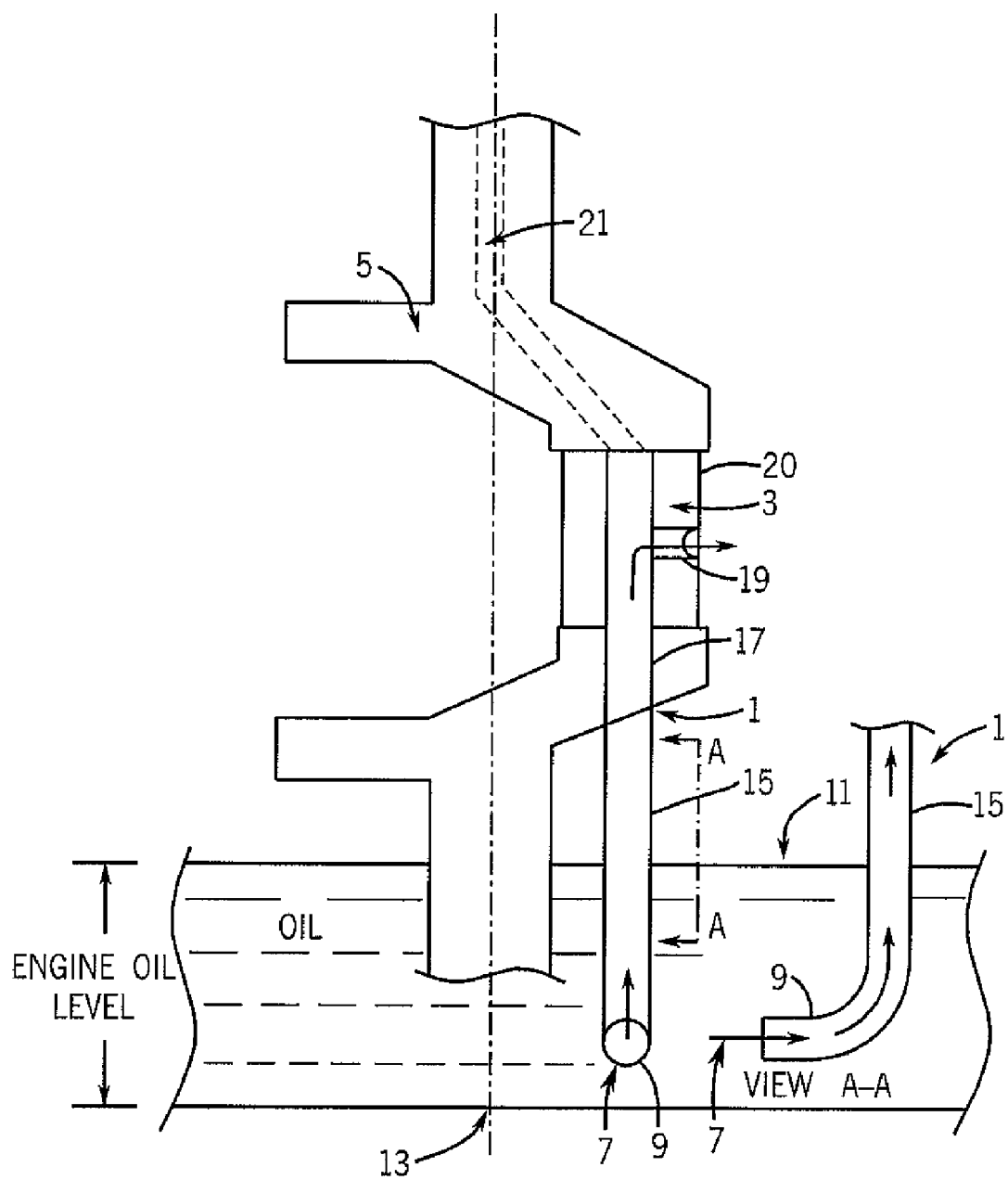
FIG. 1 shows a schematic side view of the oil pump of this invention.

As shown in FIG. 1, a conduit 1 extends down from a connecting rod journal 3 of an engine crankshaft 5. Conduit 1 is shown as an L-shaped tube in this embodiment. The orientation of crankshaft 5, and the engine axis, is vertical by design. The conduit tube 1 has an opening 7 at its lower portion 9. The lower portion opening 7 in the conduit 1 resides as far as feasible below the surface of the engine crankcase oil level 11. The opening 7 of the conduit 1 is oriented tangentially to the radius extending from the crankshaft axis 13 to the connecting rod journal 3 (e.g., along one of the crank arms). As the engine crankshaft 5 rotates, oil is forced into the opening 7 of conduit 1, up through an upper portion 15 of the conduit 1 and into a flow channel 17 in the crankshaft connecting rod journal 3. Cross-drilled holes 19 within the journal 3 allow the oil to flow outward from channel 17 and onto the outboard bearing surfaces 20. In addition, centripetal forces act on the oil and aid flow once it reaches the cross drilled holes 19. In at least some embodiments, oil is pressure fed by forced peristaltic action into and through the upper portion 15 to the desired bearing features to be lubricated.

Additionally, the shape of the conduit 1 is not necessarily constrained to a round cross section. For example, in some embodiments (not shown), the opening of conduit 1 can be flared like a nozzle/diffuser to increase inlet pressure and overall volume flow rate. Also, conduit 1 can have other cross-section shapes, such as rectangles, ovals, etc., as desired for the application.

Further, the conduit 1 acts to splash lubricant on other engine components.

Also, depending upon the embodiment, the surfaces to be lubricated can encompass surfaces in addition to the outboard bearing surfaces of the journal 3. For example, via the journal 3, oil can also be channeled to flow through the crankshaft 5 to other significant features that require lubrication by way of an optional second oil flow path 21.

This inventive oil pump can be used with any size engine. However, the inventive oil pump is particularly useful for utility engines (i.e., small engines no more than 25 hp). Such engines are frequently used on lawnmowers and garden tractors. Also, such engines can be used on lawn care appliances such as chainsaws, leaf blowers, string trimmers, edgers, tillers, and the like.

Figure 2:
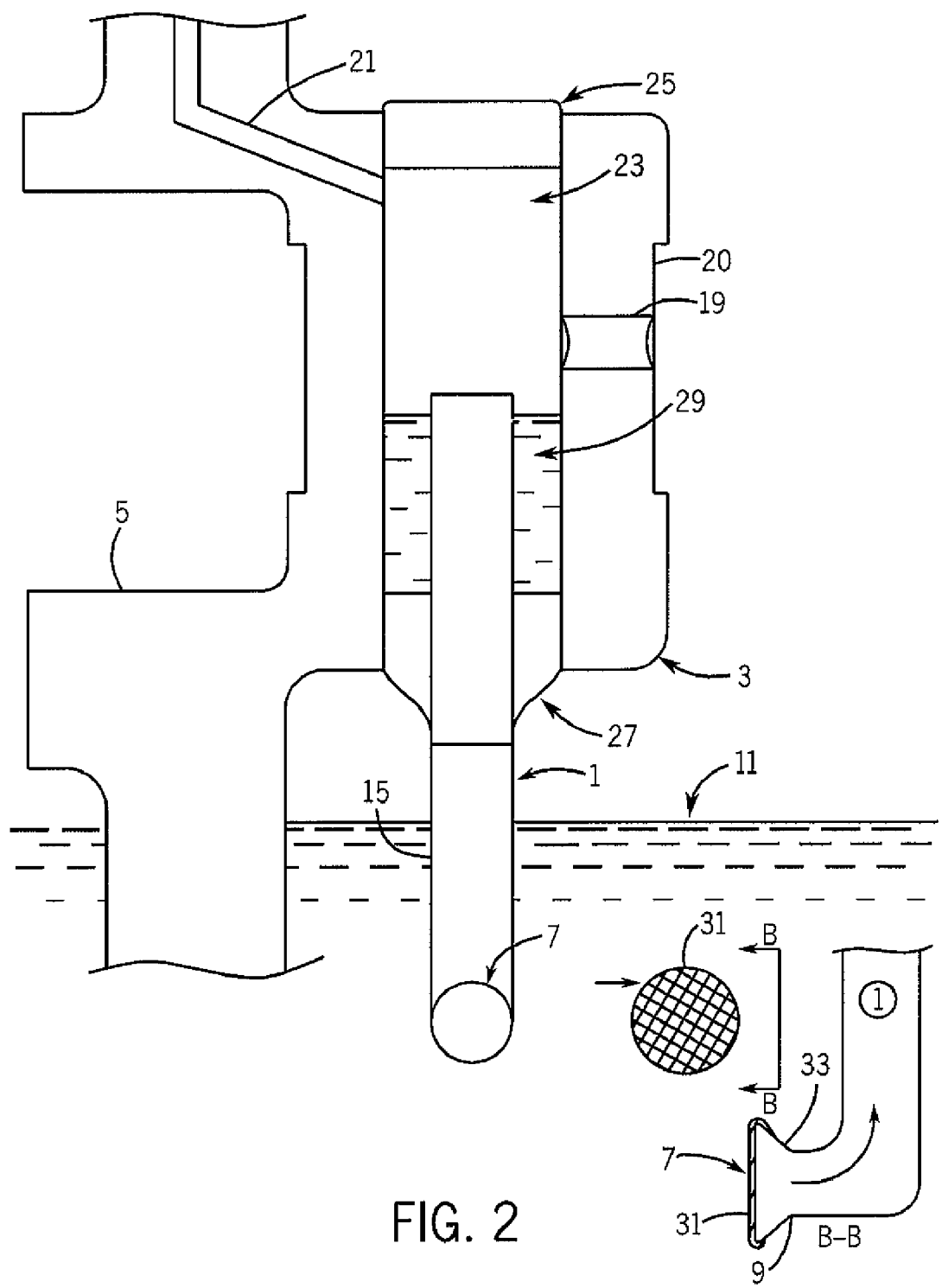
FIG. 2 shows a schematic side view of the oil pump having an oil reservoir within the journal.

Another embodiment of the invention is shown in FIG. 2. Frequently crankshaft connecting rod journals 5 are cast with pockets 23 along the axis of the journal to reduce reciprocating mass. This is desirable for several reasons. One is cost of material, a second is to help reduce the counter balance mass and therefore the overall size of the crankshaft package. Since almost all of the material strength is nearest to the outer diameter of the journal diameter, the central mass is not required for strength. The cast pocket is then machined and plugged 25 from one or both ends, depending on the casting process. This is necessary when oil is to flow under pressure through passage ways machined within the crankshaft. One embodiment of the pitot tube pump takes advantage of this configuration to incorporate at least one of the cap-plugs to become a 2-part assembly, consisting of components 1 and 27 welded or soldered together and then pressed into the crankshaft journal together. The assembly now functions as both cap-plug and pitot tube pump. In addition, with the larger void of the cavity 23 and an extended portion of the pitot tube 15, an oil reservoir 29 can be created within the crankshaft journal 5. This is very desirable since the major wear from friction on the connecting rod bearing surface and the journal surface originates during cold start-up of the engine. Generally, the faster oil can reach these features, the longer the life of the engine. The oil reservoir level within the journal can be regulated to coincide with the lubricating channel 19 which communicates with the connecting rod bearing surface 20.

In addition, generally a method is provided to filter some amount of debris from the oil traveling through an engine. Typically, small engines that have an oil pump system only use a "screen" to accomplish this task. The pitot tube oil pump inlet 7 in this case would be flared 33 and covered with screening media 31 to provide the filtering scheme as such.

In addition, in lieu of having drilled oil cavities to feed the upper crankshaft main bearing journal (bearing not shown) a second assembly comprising 1 and 27 could be pressed into the upper end of the crankshaft journal void. In this case the tube 1 could be a straight tube (smaller in diameter at its exit) and could function to lubricate the upper crankshaft main bearing by means of high velocity spray. Small engines typically accomplish this by using gear teeth immersed in the engine oil and driven by the crankshaft or camshaft to "fling" the oil throughout the interior of the engine case.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of providing lubricating oil to a bearing surface of a connecting rod journal on a crankshaft, the connecting rod journal offset from an axis of rotation of the crankshaft wherein the connecting rod journal comprises an interior chamber at least partially defined by a base axially extending through the connecting rod journal wherein any open end of the bore is covered by a cap, the method comprising:

immersing an open lower end of a conduit in a volume of oil contained within an engine crankcase, wherein an upper end of the conduit connects to the connecting rod journal and wherein a first channel is in fluid communication with the upper end of the conduit and the interior chamber;

positioning the conduit such that the open lower end is oriented tangentially to a radius extending from the crankshaft axis of rotation to an upper end of the conduit, wherein the conduit is bent such that the lower open end has an opening facing towards a direction of rotation of the crankshaft; and, rotating the crankshaft around the axis of rotation such that the lower end of the conduit moves through the volume of oil in a circular path centered on the axis of rotation;

wherein movement of the conduit through the volume of oil forces oil to flow through the conduit and first channel to the interior chamber.

2. The method of claim 1, further comprising splashing oil onto additional bearing surfaces.

3. The method of claim 1, further comprising forcing oil to flow through a second channel to at least one second bearing surface.

4. The method of claim 1, wherein the conduit is substantially parallel to the crankcase axis of rotation.

5. The method of claim 1, wherein the lower end of the conduit is substantially perpendicular to the upper end of the conduit.

6. The method of claim 1, wherein the conduit is an L-shaped tube.

7. The method of claim 1, wherein the conduit has a circular cross-section.

8. The method of claim 1, wherein the open lower end of the conduit is flared.

9. An oil pump comprising:

an engine crankshaft having an axis of rotation, the crankshaft comprising a connecting rod journal that is offset from the axis of rotation and is located on a portion of the crankshaft that extends through a crankcase, wherein the crankcase is designed to contain a volume of oil having an upper surface and wherein the connecting rod journal comprises an interior chamber wherein the interior chamber is at least partially defined by a bore axially extending through the connecting rod journal wherein any open end of the bore is covered by a cap;

a conduit extending from the connecting rod journal to a point below the upper surface of the volume of oil, wherein the conduit has an open lower end and wherein the conduit is bent such that the open lower end is oriented tangentially to a radius extending from the crankshaft axis of rotation to an upper end of the conduit and wherein the upper end of the conduit is in fluid communication with the interior chamber; and, a first channel providing fluid communication between a first bearing surface located on the connecting rod journal and the interior chamber.

10. The oil pump of claim 9, wherein the crankshaft axis of rotation is oriented vertically.

11. The oil pump of claim 9, wherein the upper end of the conduit is substantially parallel to the crankcase axis of rotation.

12. The oil pump of claim 9, wherein the lower end of the conduit is substantially perpendicular to the upper end of the conduit.

13. The oil pump of claim 9, wherein the conduit is an L-shaped tube.

14. The oil pump of claim 9, further comprising a second channel providing fluid communication between the upper end of the conduit and a second bearing surface on or in contact with the crankshaft.

15. The oil pump of claim 9, wherein the conduit has a circular cross-section.

16. The oil pump of claim 9, wherein the open lower end of the conduit is flared.

17. The oil pump of claim 9, wherein the cap, or at least one cap if more caps are present, comprises an assembly, the assembly comprising an adaptor sleeve and an upper end of the conduit.

18. The oil pump of claim 17, wherein the assembly is press fit into the open end of the bore.

19. The oil pump of claim 9, further comprising a second channel providing fluid communication between the interior chamber and a second bearing surface on or in contact with the crankshaft.

20. An engine comprising an oil pump, wherein the oil pump comprises:
- an engine crankshaft having an axis of rotation, the crankshaft comprising a connecting rod journal that is offset from the axis of rotation and is located on a portion of the crankshaft that extends through a crankcase, wherein the crankcase is designed to contain a volume of oil having an upper surface and wherein the connecting rod journal comprises an interior chamber at least partially defined by a bore axially extending through the connecting rod journal wherein any open end of the bore is covered by a cap;
- a conduit extending from the connecting rod journal to a point below the upper surface of the volume of oil, wherein the conduit has an open lower end and wherein the conduit is bent such that the open lower end is oriented tangentially to a radius extending from the crankshaft axis of rotation to an upper end of the conduit and wherein the upper end of the conduit is in fluid communication with the interior chamber; and,
- a first channel providing fluid communication between a first bearing surface located on the connecting rod journal and the interior chamber.

21. The engine of claim 20, wherein the engine is a utility engine.

22. A lawnmower comprising the engine of claim 21.

23. A lawn care appliance comprising the engine of claim 21.

24. The engine of claim 20, wherein the crankshaft axis of rotation is oriented vertically.

25. The engine of claim 20, wherein the upper end of the conduit is substantially parallel to the crankcase axis of rotation.

26. The engine of claim 20, wherein the lower end of the conduit is substantially perpendicular to the upper end of the conduit.

27. The engine of claim 20, wherein the conduit is an L-shaped tube.

28. The engine of claim 20, further comprising a second channel providing fluid communication between the upper end of the conduit and a second bearing surface on or in contact with the crankshaft.

29. The engine of claim 20, wherein the conduit has a circular cross-section.

30. The engine of claim 20, wherein the open lower end of the conduit is flared.

31. The engine of claim 20, wherein the open lower end of the conduit remains continuously below the upper surface of the volume of oil when the crankshaft rotates about the axis of rotation.

32. An engine comprising an oil pump, wherein the oil pump comprises:
- an engine crankshaft having an axis of rotation, the crankshaft comprising a connecting rod journal that is offset from the axis of rotation and is located on a portion of the crankshaft that extends through a crankcase, wherein the crankcase is designed to contain a volume of oil having an upper surface;
- a conduit extending from the connecting rod journal to a point below the upper surface of the volume of oil, wherein the conduit has an open lower end and wherein the conduit is bent such that the open lower end is oriented tangentially to a radius extending from the crankshaft axis of rotation to an upper end of the conduit wherein the open lower end of the conduit remains continuously below the upper surface of the volume of oil when the crankshaft rotates about the axis of rotation; and,
- a first channel providing fluid communication between a first bearing surface located on the connecting rod journal and the upper end of the conduit.

33. The engine of claim 32, wherein the crankshaft axis of rotation is oriented vertically.

34. The engine of claim 32, wherein the upper end of the conduit is substantially parallel to the crankcase axis of rotation.

35. The engine of claim 32, wherein the lower end of the conduit is substantially perpendicular to the upper end of the conduit.

36. The engine of claim 32, wherein the conduit is an L-shaped tube.

37. The engine of claim 32, further comprising a second channel providing fluid communication between the upper end of the conduit and a second bearing surface on or in contact with the crankshaft.

38. The engine of claim 32, wherein the conduit has a circular cross-section.

39. The engine of claim 32, wherein the open lower end of the conduit is flared.

* * * * *